Dec. 20, 1966 D. M. KITTERMAN 3,293,048
FOOD AND BEVERAGE COOKING CONTAINER AND METHOD OF USING SAME
Filed Feb. 24, 1964 2 Sheets-Sheet 1
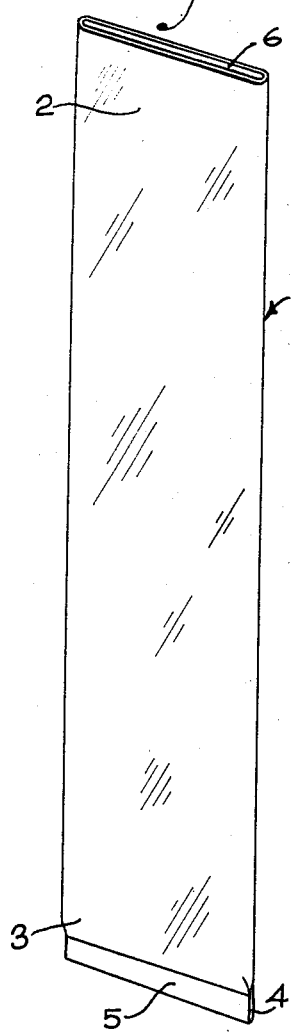
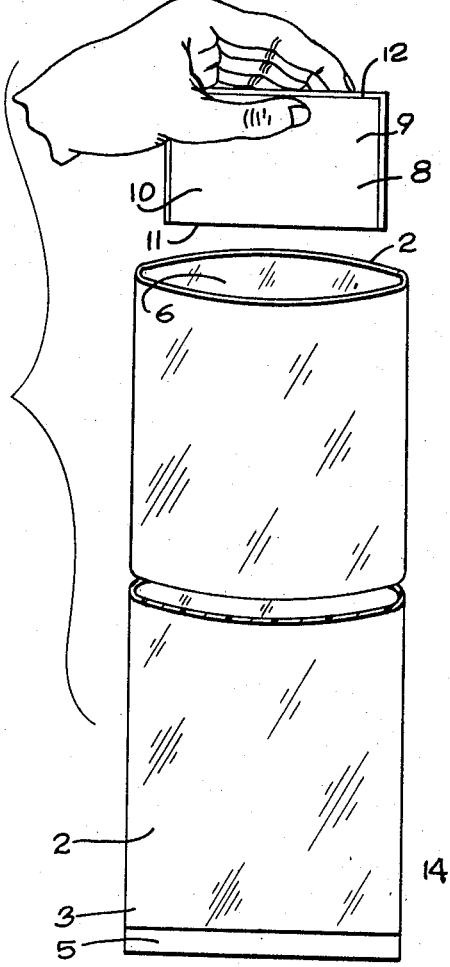
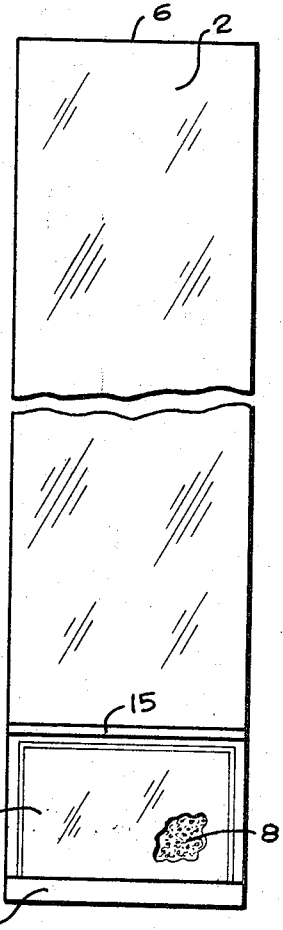
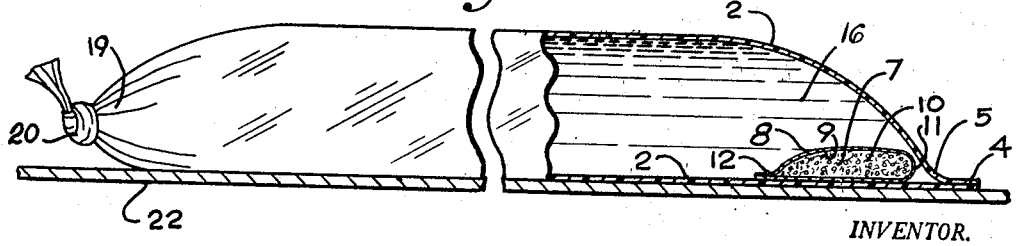
INVENTOR.
DONALD M. KITTERMAN
BY
Fishburn and Gold
ATTORNEYS Dec. 20, 1966  D. M. KITTERMAN  3,293,048
FOOD AND BEVERAGE COOKING CONTAINER AND METHOD OF USING SAME
Filed Feb. 24, 1964  2 Sheets-Sheet 2
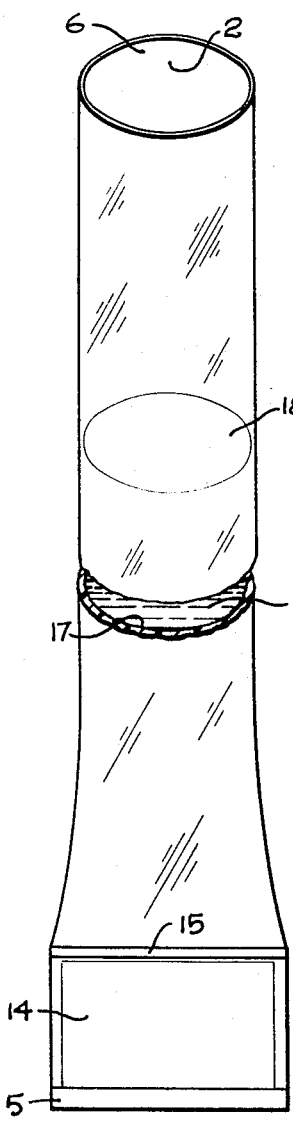
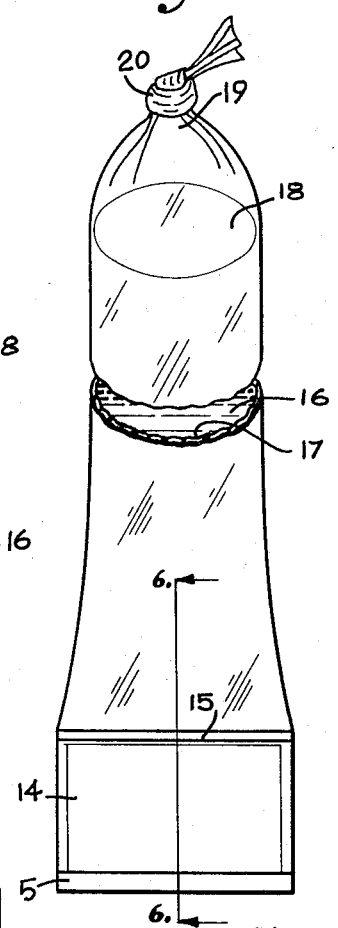
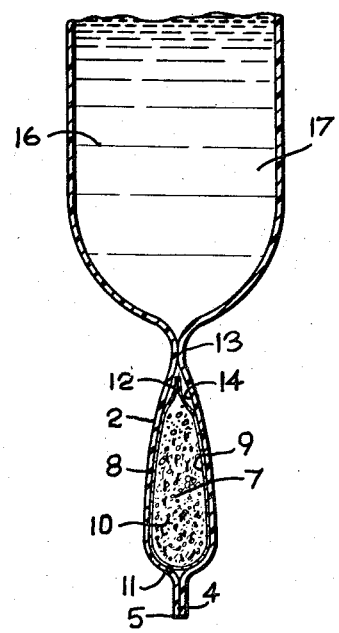
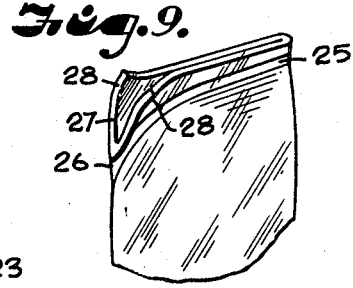
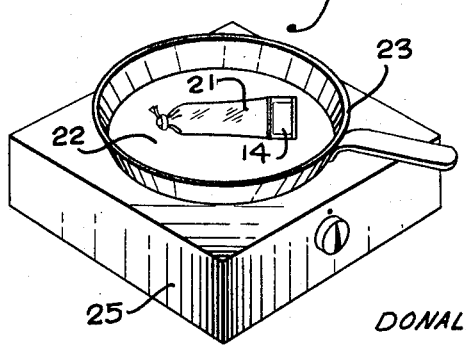
INVENTOR.
DONALD M. KITTERMAN
BY
Fishburn and Gold
ATTORNEYS

United States Patent Office 3,293,048
Patented Dec. 20, 1966

3,293,048
FOOD AND BEVERAGE COOKING CONTAINER
AND METHOD OF USING SAME
Donald M. Kitterman, 1401 Fairfax Trafficway,
Kansas City, Kans. 66115
Filed Feb. 24, 1964, Ser. No. 346,799
2 Claims. (Cl. 99—171)

This invention relates to the art of cooking food and brewing hot beverages wherein hot water is contacted with food or beverage ingredients in a closed container, and more particularly to a food or beverage package in which water is introduced and maintained separate from the food or beverage ingredients until heated in the cooking or brewing process.

There are many occasions and situations wherein facilities for preparing quantities of hot liquid foods and beverages are not available and in others the person may desire only a small quantity, as for example a cup of coffee steeped from real ground coffee wherein the conventional instant type coffee would not be acceptable. Also, there may be space limitations as to transportation of food and beverage materials into areas where water is available and, in other instances, it may be desirable to package the water with the food material in a sanitary unit for transportation into areas where water in the areas may be in short supply or contaminated.

The present invention contemplates a food or beverage package and cooking or brewing container which may be easily transported, handled and used to solve the above-mentioned difficulties, with the principal objects of the invention being to provide a combined food or beverage package and cooking or brewing container of thin pliable impervious material capable of withstanding cooking or brewing temperatures and adapted to contain liquid and food or beverage ingredients in separated condition until during the cooking or brewing process; to provide an envelope or receptacle formed of food compatible high melting point plastic film closed at one end with the opposed walls secured together with a rupturable seal line spaced from said closed end to define a closed food or beverage material containing compartment therebetween, the remainder of the receptacle from the rupturable seal line to the other end being adapted to receive liquid such as water for use in the preparation of the liquid food or beverage; to provide such a package wherein the food or beverage material is contained in a porous fabric container or inner receptacle positioned in said compartment between the closed end and the rupturable seal line of the outer receptacle; to provide a method of use of such a food or beverage package with food or beverage material in the said compartment and the other end of the receptacle is open, by introducing water or other suitable liquid into the receptacle, providing a pressure-tight closure at said open end and then subjecting the container to heat, vaporizing a portion of the water or liquid to form internal pressure to rupture the seal line whereby the liquid or water enters the compartment and contacts the beverage or food making material in the fabric container to form the hot liquid food or beverage; and to provide a combined beverage or food package and cooking or brewing container that is economical to manufacture, easy to transport and store and that maintains the contents in a sanitary condition until time of use and that merely needs to be subjected to heat of suitable temperature for the cooking or brewing to complete the preparation of the food or beverage.

Other objects and advantages of this invention will become apparent from the following description taken in connection with the accompanying drawings wherein are set forth by way of illustration and example certain embodiments of this invention.

FIG. 1 is a perspective view of a receptacle for use in the present invention.

FIG. 2 is a perspective view illustrating the introduction of a packet of food or beverage material into the receptacle.

FIG. 3 is a side elevation of the receptacle with the food or beverage packet at the closed end thereof and a rupturable seal between the opposed walls to form a compartment in which the food or beverage packet is located.

FIG. 4 is a perspective view of the food or beverage containing receptacle with liquid introduced into the open end thereof.

FIG. 5 is a perspective view of the receptacle closed to confine the liquid.

FIG. 6 is a partial sectional view through the receptacle taken on the line 6—6, FIG. 5.

FIG. 7 is a perspective view showing the closed liquid containing receptacle in condition to be heated to cook or brew the food or beverage.

FIG. 8 is a sectional view through the closed receptacle after being heated and the compartment seal ruptured.

FIG. 9 is a modified form of liquid and food containing receptacle with the open end closed by heat sealing or the like and presenting tabs for facilitating opening thereof.

Referring more in detail to the drawings:

The reference numeral 1 generally designates a receptacle or envelope formed of flexible or pliable food compatible high melting point impervious sheet material capable of being sealed or otherwise closed wherein the seal or closure is capable of withstanding temperatures necessary in cooking or brewing food or beverage material to be prepared therein. The envelope or outer receptacle 1, in the illustrated structure, is an elongate tubular member with the side walls 2 flattened or otherwise brought together at one end 3 and sealed as at 4 by heat sealing or the like to form a closed end 5. It is to be understood that the receptacle may be of tubular material; however, it can be formed by folding sheet material and sealing along a longitudinal edge as in conventional practice, to provide an elongate tube-like receptacle which may be sealed at one end to form the closed end 5 with the other end 6 open. It is to be understood that foil and also any food compatible plastic film having a melting point substantially above the temperature to which the material is to be subjected and that is capable of being sealed to withstand such temperatures is suitable for making of the receptacle.

For use in preparing of beverages such as coffee, tea and the like, an example of suitable film is a film of polymeric terephthalate esters, such as is sold under the trademark "Mylar." Also, in receptacles adapted to contain a quantity of material and liquid to make, for example, one cup of beverage, it has been found that such film of approximately ½ mil thickness is suitable. In larger containers, or in instances of rough handling, the film thickness may be increased for additional strength withstanding the stress, as for example 2 mils thickness.

In preparing the package, a quantity of food or beverage material 7 in a dry or granular state, as for example tea leaves for making of tea, ground real coffee or dry soup making ingredients or other dry food making materials for combining with a liquid to make the desired food product is enclosed forming a packet 8 which includes an inner receptacle with walls 9 of porous fabric or the like. The packet 8 is such that the dry food or beverage making material is contained within the chamber 10 formed by the porous walls 9 but water can readily pass through the small interstices when admitted thereto. The end 6 of the receptacle 1 is opened and the packet 8 containing the food or beverage ingredients is dropped therein whereby said packet moves longitudinally inside of the receptacle to a position at the closed end 5 of the receptacle 1. It is preferred that the packet 8 be relatively flat so that one edge 11 thereof closely lies against the closed end which is also preferably flattened by the seal 4 of the closed end. The walls 2 adjacent the edge 12 opposite the edge 11 of the packet and spaced therefrom are suitably sealed together in a line of joinder 13 which cooperates with the walls of the receptacle surrounding the packet 8 and the closed end 5 to define a compartment 14 that is water-tight. The joinder line 13 may be by cement or heat seal but is characterized by being rupturable by internal pressure or the walls at the line of joinder 13 being otherwise separable from each other by subjection of temperatures slightly below the temperature to which the package is to be subjected in cooking or brewing the food or beverage to be prepared therein without perforation or damage to said walls 2. It is preferred that a light heat seal be applied in a line 15 to form the joinder of the inner surfaces of the walls at the line 13, the heat seal being at a rate or temperature to form a low grade type of seal that will separate at low internal pressures tending to move the walls apart without damage to the walls of the receptacle. Furthermore, this separation is such that it occurs without damage or danger of rupture of other seals or the walls 2 of the receptacle 1.

The receptacle with the food packet sealed in the compartment 14 may be stored or shipped to a point of use and liquid introduced just prior to preparation of the food or beverage or the water or liquid may be introduced and the open end closed and the entire prepared receptacle of the food or beverage making materials shipped to a point of use.

The receptacle with the food packet in the compartment 14 and said compartment sealed is held upright and the end 6 opened and water or other suitable liquid 16 introduced therein to fill the chamber or space 17 in the receptacle from the seal or joinder 13 to a desired level 18 to provide a suitable quantity of liquid to make the desired food or beverage. The open end is then provided with a closure or seal 19 that is water-tight whereby the water remains within the space defined by the impervious receptacle walls 2 between the joinder 13 and the closure 19. The thin pliable film is such that the portion adjacent the open end 6 may be tied into a knot 20 to form an effective closure. The receptacle 1 with the food or beverage packet 8 sealed in the compartment 14 and liquid in the closed chamber 17 between the seal line 13 and closure 19 forms a food or beverage packet that also is the cooking or brewing container.

In cooking the food or brewing the beverage the completed assembly 21 is placed on a suitable heating surface 22, as for example in a skillet or pan 23 or on a hot plate, and subjected to heat as by a heater 24. As the temperature rises, some of the liquid 16 is vaporized forming an internal pressure that effects the separation of the walls 2 at the joinder 13 so that the seal is ruptured and the liquid enters the compartment 14 to steep the flavor and the like from the ingredients 7 contained in the porous packet 8, as illustrated in FIG. 8. When heated sufficiently to complete the cooking or brewing of the food or beverage, the assembly 21 is lifted from the hot surface and is opened whereby the liquid food or beverage may be poured therefrom into a suitable container.

In packages wherein it is particularly desired to place the liquid 16 in the receptacle 1 and seal same for long storage and shipping, particularly into areas wherein liquids are not readily available, it is preferred that the open end 6 of the receptacle be provided with a more complete or durable seal and to provide means for facilitating opening thereof. Such a structure is particularly shown in FIG. 9 wherein the receptacle 1 with the liquid 16 introduced into the chamber portion 17 and the walls at the open end are brought together and sealed as at 25 as by heat sealing with one corner 26 outwardly of the seal line split slightly longitudinally as at 27 to form tabs 28 that may be grasped and pulled apart to aid in breaking or effecting an opening through the seal 25 or in the walls of the receptacle adjacent thereto for access to the food or beverage that has been completed in the receptacle.

It is to be understood that while I have illustrated and described certain forms of my invention, it is not to be limited to the specific forms or arrangement of parts herein described and shown except insofar as such limitations are included in the claims.

What I claim and desire to secure by Letters Patent is:
1. A combined food package and cooking container comprising,
   (a) an outer receptacle formed of a food compatible high melting point impervious flexible sheet material, said receptacle having walls connected in the form of a closed container,
   (b) an inner receptacle formed of porous sheet material and containing dry food making material,
   (c) said inner receptacle being confined in said outer receptacle with said walls of the outer receptacle being connected in surrounding relation to said inner receptacle to separate said inner receptacle from the remainder of the interior, a portion of said connection being a seal line that is rupturable,
   (d) and a quantity of liquid in the outer receptacle spaced from said inner receptacle and maintained separately therefrom by said connection of the outer receptacle walls, said seal line connection being rupturable to permit the liquid to enter the inner receptacle in contacting relation to the food making material and form a hot liquid food in response to internal pressure from subjecting said outer receptacle with the liquid therein to heat and vaporize a portion of said liquid.

2. The process of preparing hot foods comprising,
   (a) providing a receptacle in the form of an elongate thin walled flexible envelope of food compatible high melting point impervious plastic film, with one end open and the other end closed,
   (b) placing a quantity of dry food making material selected from the class of ground coffee and tea and dry soup mixes in a porous fabric container of the size to be inserted into the flexible envelope,
   (c) placing the food making material container in the envelope and moving it to adjacent the closed end,
   (d) sealing the envelope walls in a pressure rupturable seal line adjacent the food material container to form two compartments in the envelope with the food making material container in one adjacent the closed end of the envelope,
   (e) introducing a quantity of water into the open end of the envelope and tying said open end portion to close same to confine the water in the other of said compartments separated from the food making material container,
   (f) subjecting the envelope to heat for a period of time sufficient to heat the water and vaporize a portion thereof thus creating an internal pressure sufficient to rupture said seal line and permit the water to enter and contact the food making material in the fabric container, (g) continuing the heating of the envelope and contents to complete the cooking thereof, (h) and opening said envelope for access to the cooked food.

References Cited by the Examiner

UNITED STATES PATENTS

| | | | |
|---|---|---|---|
| 618,677 | 1/1899 | Humphrey | 99—77.1 |
| 1,127,780 | 2/1915 | Konar | 99—77.1 |
| 2,087,236 | 7/1937 | Anders | 99—77.1 |
| 2,793,776 | 5/1957 | Lipari | 99—171 X |
| 2,824,010 | 2/1958 | Pedersen | 99—171 |
| 2,885,104 | 5/1959 | Greenspan | 206—47 X |
| 3,028,000 | 4/1962 | Clements et al. | 206—47 |
| 3,039,644 | 6/1962 | Lefcort | 919—171 X |
| 3,199,437 | 8/1965 | Nelsen | 99—77.1 X |

A. LOUIS MONACELL, Primary Examiner.

RAYMOND N. JONES, Assistant Examiner.